(12) United States Patent
Wagatsuma et al.

(10) Patent No.: US 6,706,978 B2
(45) Date of Patent: Mar. 16, 2004

(54) TILT DETECTOR

(75) Inventors: Tadashi Wagatsuma, Miyagi-ken (JP); Shuichi Kuwabara, Miyagi-ken (JP); Yoshiro Yoshida, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/356,669

(22) Filed: Jan. 30, 2003

(65) Prior Publication Data

US 2003/0196878 A1 Oct. 23, 2003

(30) Foreign Application Priority Data

Feb. 7, 2002 (JP) ........................................ 2002-030991

(51) Int. Cl.$^7$ ............................. H01H 35/14; G01C 9/10
(52) U.S. Cl. ............................. 200/61.45 R; 200/61.52; 200/277; 200/DIG. 29
(58) Field of Search ................ 200/61.45, 61.48–61.53, 200/277, DIG. 29

(56) References Cited

U.S. PATENT DOCUMENTS

| | | | | | |
|---|---|---|---|---|---|
| 1,915,267 A | * | 6/1933 | Bigelow | .................. | 200/61.52 |
| 4,591,676 A | * | 5/1986 | Jackman et al. | ..... | 200/DIG. 29 |
| 4,628,160 A | * | 12/1986 | Canevari | ............. | 200/61.45 R |
| 4,751,353 A | * | 6/1988 | Stephens | .................... | 200/277 |
| 5,025,246 A | * | 6/1991 | Schenkel | ............. | 200/61.45 R |
| 5,252,795 A | * | 10/1993 | Su | .......................... | 200/61.52 |
| 5,285,033 A | * | 2/1994 | Ipcinski | ................... | 200/61.52 |
| 5,808,254 A | * | 9/1998 | Wu | ...................... | 200/61.45 R |
| 5,877,686 A | * | 3/1999 | Ibey et al. | ............... | 200/61.52 |
| 5,955,713 A | | 9/1999 | Titus et al. | | |
| 6,005,205 A | | 12/1999 | Chou | | |
| 6,198,059 B1 | * | 3/2001 | Jou | ......................... | 200/61.52 |
| 6,448,516 B1 | * | 9/2002 | Chiang | ............... | 200/61.45 R |
| 6,559,396 B1 | * | 5/2003 | Chou | ..................... | 200/61.52 |

* cited by examiner

Primary Examiner—James R. Scott
(74) Attorney, Agent, or Firm—Beyer Weaver & Thomas, LLP (57) ABSTRACT

A spherical movable contact is housed in housing portions of a first case and a second case so as to be able to roll, and is to come into or go out of contact with a first fixed contact and a second fixed contact. The first case and the second case are fixed to each other so as to form an integral body in such a manner that the first fixed contact and the second fixed contact are opposed to each other. At least one of the first fixed contact and the second fixed contact is divided. The movable contact is disposed so as to roll while bridging the first fixed contact and the second fixed contact. Contact portions where the movable contact is to contact the first fixed contact and the second fixed contact assume arc shapes, respectively.

4 Claims, 6 Drawing Sheets

TILT DETECTOR

BACKGROUND OF THE INVENTION

1. Field of the Invention

The present invention relates to the structure of a tilt detector that is used in products having an orientation detecting function and used in various kinds of portable electronic equipment, home game machines, toys, etc.

2. Description of the Related Art

Figure 8:
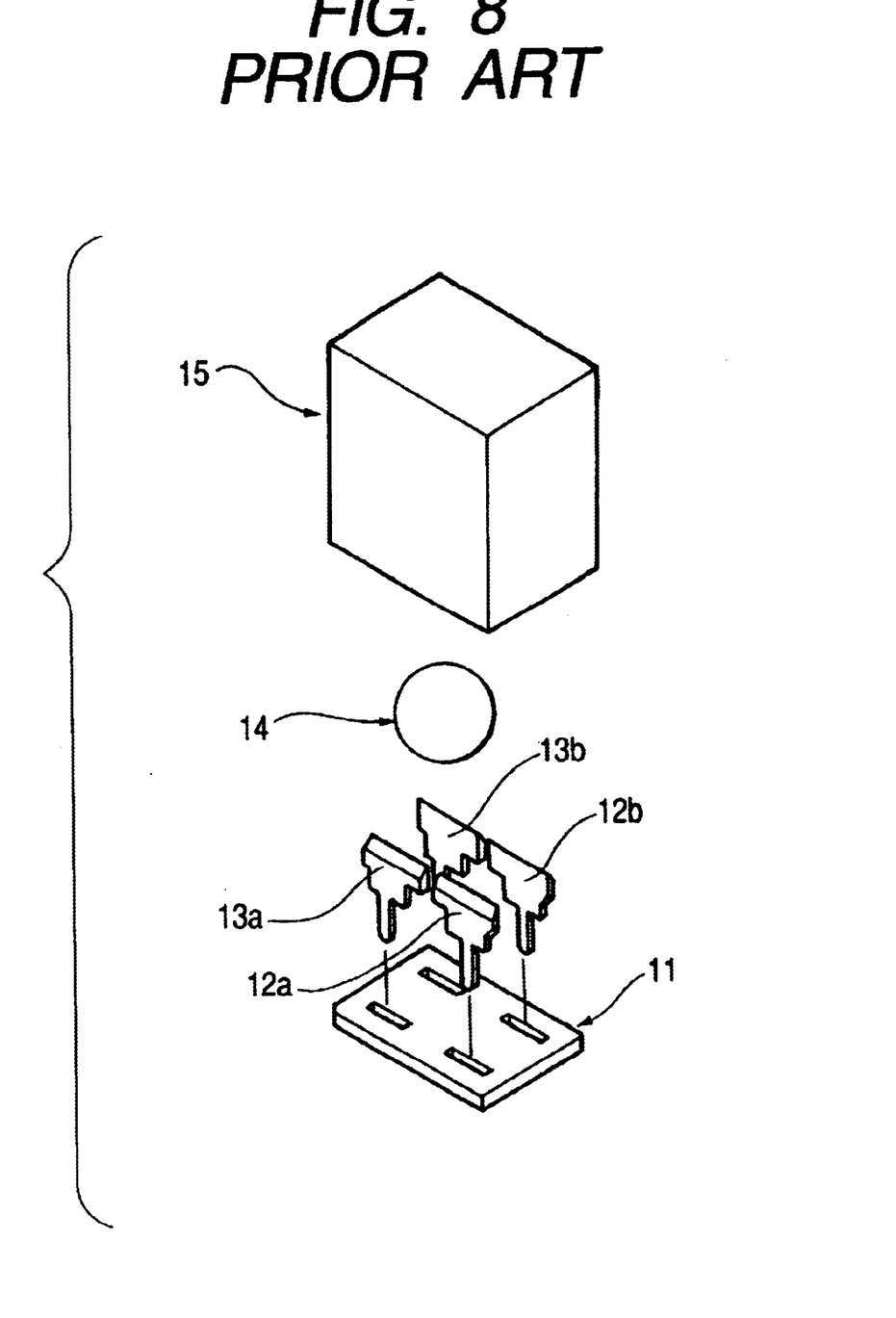
FIG. 8 is an exploded perspective view of a conventional tilt detector.
Figure 9:
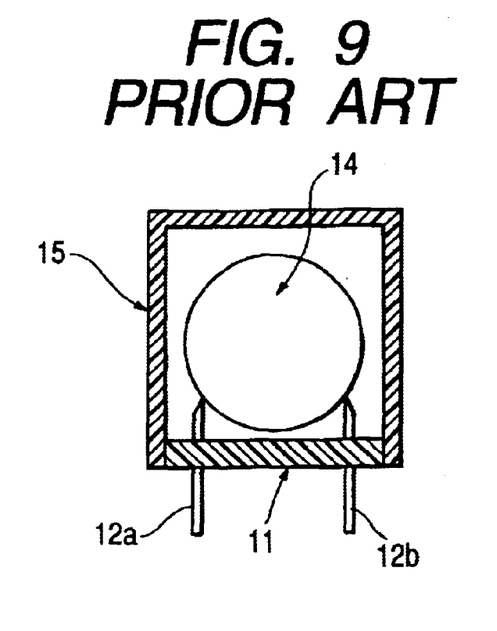
FIG. 9 is a vertical sectional view, as viewed from one side, of the tilt detector of FIG. 8.
Figure 10:
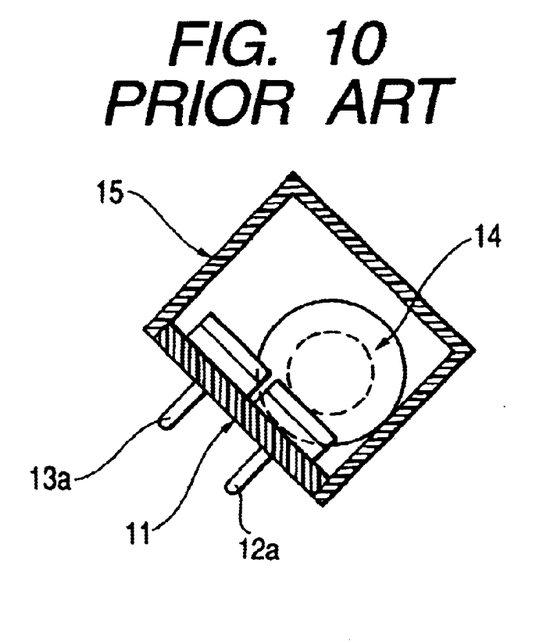
FIG. 10 illustrates how a spherical movable contact used in the tilt detector of FIG. 8 operates.

FIGS. 8–10 show the structure of a conventional tilt detector. FIG. 8 is an exploded perspective view of the tilt detector. FIG. 9 is its vertical sectional view as viewed from one side. FIG. 10 illustrates how a spherical movable contact operates.

As shown in FIGS. 8 and 9, the conventional tilt detector is composed of an insulative substrate 11 made of an insulative material, first fixed contacts 12a and 12b that are conductive metal plates and are mounted on the insulative substrate 11 so as to be parallel with each other, second fixed contacts 13a and 13b that are disposed adjacent to the first fixed contacts 12a and 12b so as to be parallel with each other, a spherical movable contact 14 that is made of a conductive metal and is to be in or out of contact with the first fixed contacts 12a and 12b and the second fixed contacts 13a and 13b, and a box-shaped case 15 that is made of an insulative material such as a synthetic resin and is attached to the insulative substrate 11 so as to cover it.

The two first fixed contacts 12a and 12b are mounted on the insulative substrate 11 so as to be opposed to each other. Similarly, the two second fixed contacts 13a and 13b are mounted on the insulative substrate 11 so as to be adjacent to the first fixed contacts 12a and 12b and opposed to each other. The interval between the first fixed contacts 12a and 12b and the interval between the second fixed contacts 13a and 13b are smaller than the diameter of the spherical movable contact 14. Therefore, the spherical movable contact 14 rests on the top surfaces of the first fixed contacts 12a and 12b or the second fixed contacts 13a and 13b so as to bridge those.

The operation of the above-configured tilt detector will be described below. As shown in FIG. 10, in a state that a device incorporating the tilt detector is inclined rightward, the spherical movable contact 14 rolls on the fixed contacts in the tilt direction (rightward direction) of the device, whereby the first fixed contacts 12a and 12b that are located on the destination side are connected to each other by the movable contact 14. The tilt direction of the device can be detected by the connection of the right-hand first fixed contacts 12a and 12b.

Conversely, in a state that the device incorporating the tilt detector is inclined leftward (not shown), the spherical movable contact 14 rolls on the fixed contacts in the tilt direction (leftward direction) of the device, whereby the second fixed contacts 13a and 13b that are located on the destination side are connected to each other by the movable contact 14. The tilt direction of the device can be detected by the connection of the left-hand second fixed contacts 13a and 13b.

However, the above-described conventional tilt detector is configured in such a manner that the many fixed contacts, that is, the first fixed contacts 12a and 12b and the second fixed contacts 13a and 13b, are mounted on the insulative substrate 11. Since variations are prone to occur in the intervals between the contacts, there is a problem that the contact is unstable and hence the detection accuracy is low. Further, because of its structure, the tilt detector can detect a tilt only in two directions.

SUMMARY OF THE INVENTION

An object of the present invention is therefore to solve the above problems and thereby provide a tilt detector capable of detecting a tilt in a larger number of directions and increasing the detection accuracy through stabilized contact.

To attain the above object, the invention provides a tilt detector comprising a first case that has a housing portion and in which a first fixed contact is provided on a bottom surface of the housing portion; a second case that has a housing portion and in which a second fixed contact is provided on a bottom surface of the housing portion; and a spherical movable contact that is housed in the housing portions of the first case and the second case so as to be able to roll and that is to come into or go out of contact with the first fixed contact and the second fixed contact, wherein the first case and the second case are fixed to each other so as to form an integral body in such a manner that the first fixed contact and the second fixed contact are opposed to each other; at least one of the first fixed contact and the second fixed contact is divided; the movable contact is disposed so as to roll while bridging the first fixed contact and the second fixed contact; and contact portions where the movable contact is to contact the first fixed contact and the second fixed contact assume arc shapes, respectively.

This tilt detector can detect a tilt in a larger number of (two or more) directions. When the movable contact contacts the first fixed contact and/or the second fixed contact, the contact points always vary as the movable contact rolls along the arc-shaped contact portions. As a result, a contact failure as would otherwise be caused by variations in the contact intervals, sticking of foreign matter, or the like can be prevented.

The tilt detector may be such that both of the first fixed contact and the second fixed contact are divided into at least two parts, and at least two divisional parts of the first fixed contact and at least two divisional parts of the second fixed contact are opposed to each other in such a manner as to be deviated from each other by 90°. This structure makes it possible to detect a tilt in a larger number of (four or more) directions. When the movable contact contacts the first fixed contact and/or the second fixed contact, the contact points always vary as the movable contact rolls along the arc-shaped contact portions. As a result, a contact failure as would otherwise be caused by variations in the contact intervals, sticking of foreign matter, or the like can be prevented.

The tilt detector may further comprise a first recess and a second recess that are formed at centers of the first fixed contact and the second fixed contact so as to project toward the bottom surfaces of the housing portions, respectively, and the movable contact may come into or go out of contact with the contact portions as it rolls across the first recess and the second recess that are opposed to each other. With this structure, since all the surfaces of the recesses across which the movable contact rolls are metal surfaces and do not include resin surfaces, there does not occur static electricity due to rolling friction or the like and hence sticking of foreign matter to the spherical movable contact is suppressed. Stable contact can thus be attained.

The tilt detector may further comprise arc-shaped first openings and arc-shaped second openings that are formed by punching at centers of the first fixed contact and the second fixed contact, respectively, and contact receiving members that are metal plates and are formed on the bottom surfaces of the housing portions, respectively, so as to be opposed to each other with the first openings and the second openings interposed in between, and the movable contact may come into or go out of contact with the contact portions as it rolls in the first openings and the second openings that are opposed to each other. In this structure, metal surfaces (including no resin surfaces) are formed in the openings across which the movable contact rolls. Therefore, there does not occur static electricity due to rolling friction or the like and hence sticking of foreign matter to the spherical movable contact is suppressed. Stable contact can thus be attained.

DESCRIPTION OF THE PREFERRED EMBODIMENTS

Figure 1:
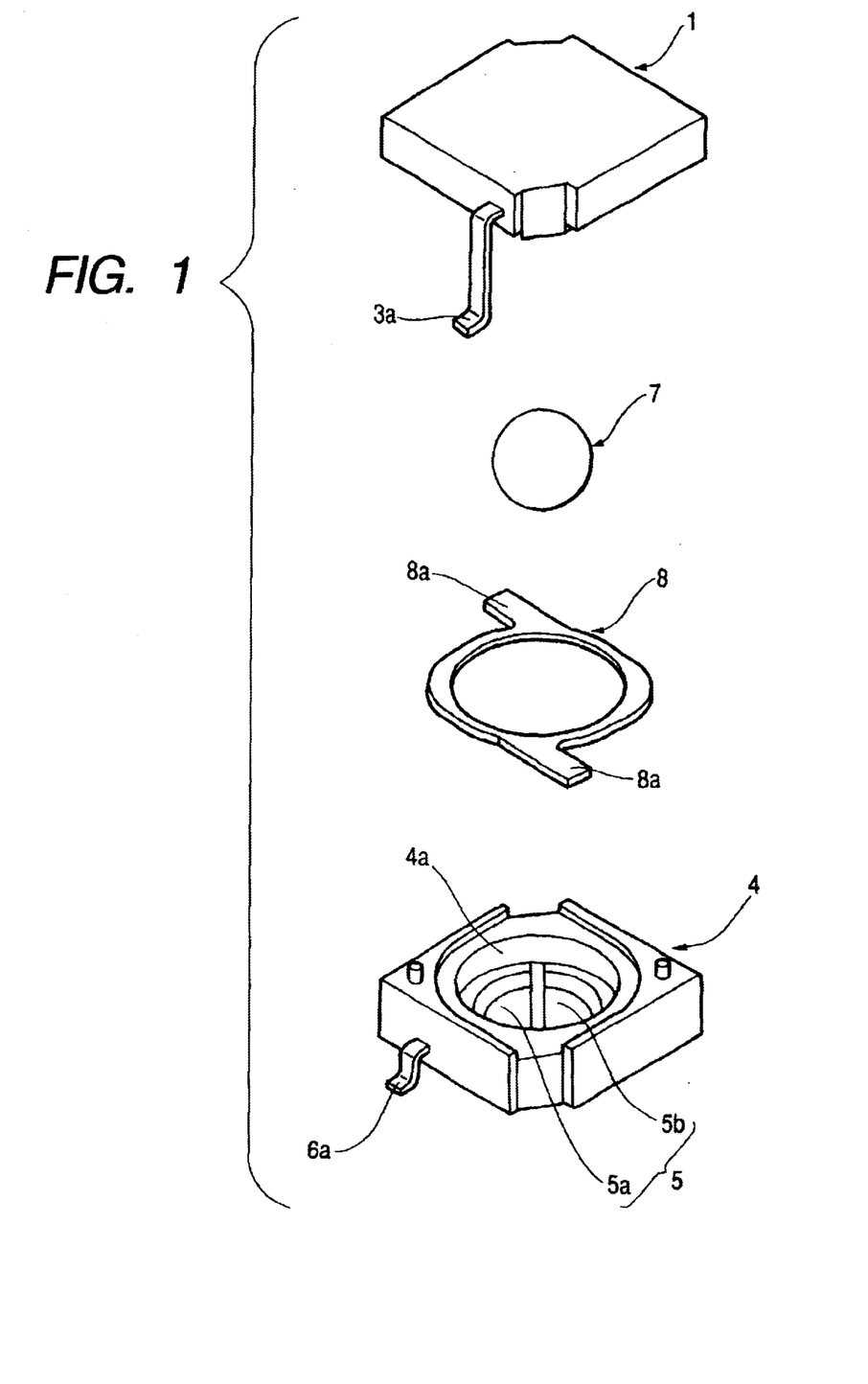
FIG. 1 is an exploded perspective view of a tilt detector according to one embodiment of the present invention.
Figure 2:
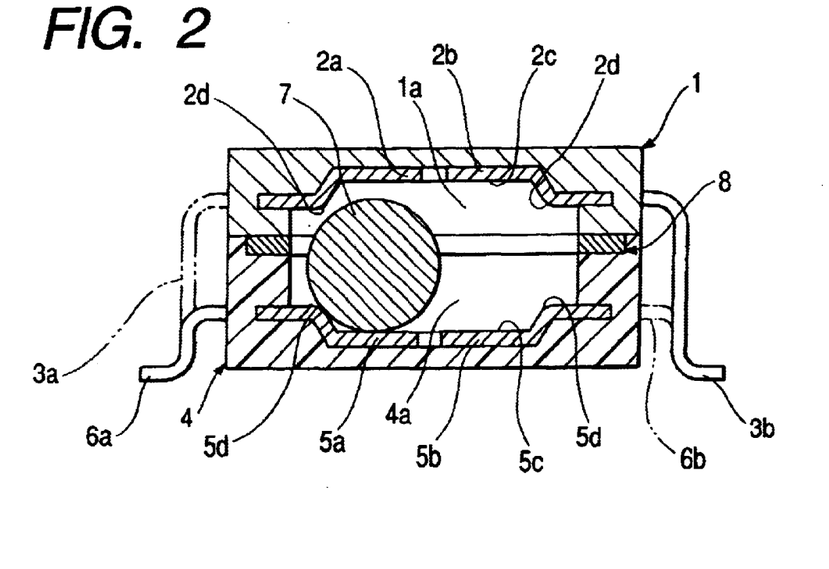
FIG. 2 is a vertical sectional view of the tilt detector of FIG. 1.
Figure 3:
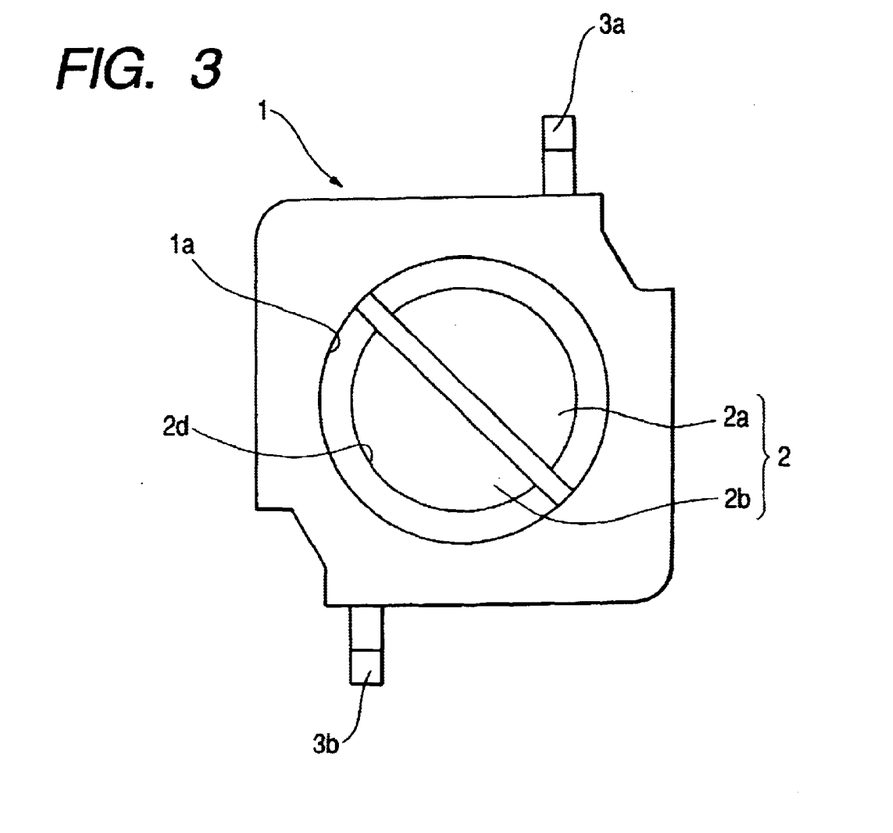
FIG. 3 is a bottom view of a first case of the tilt detector of FIG. 1.
Figure 4:
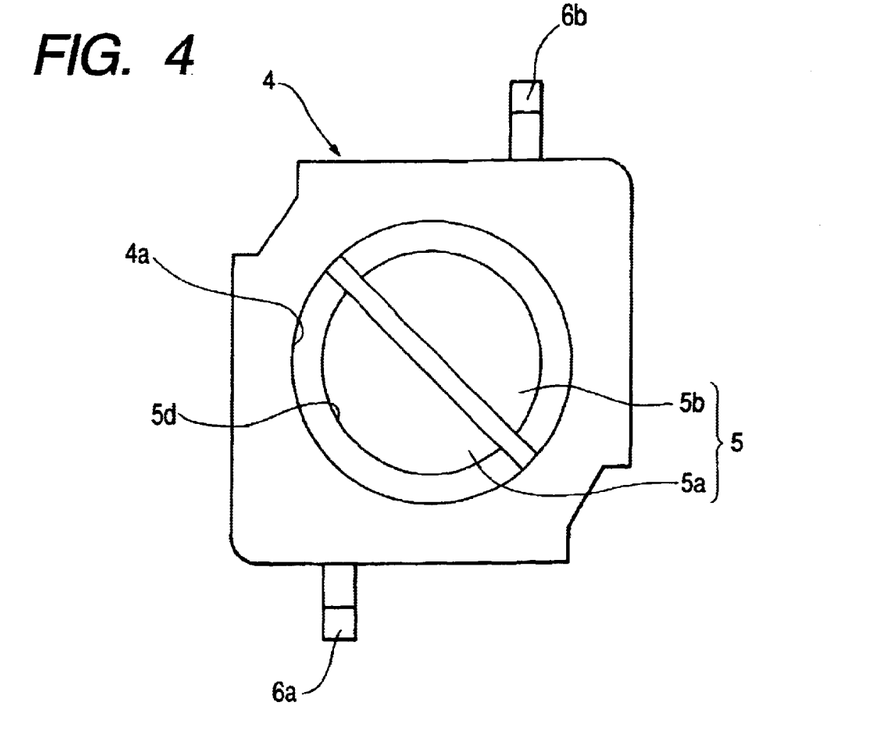
FIG. 4 is a plan view of a second case of the tilt detector of FIG. 1.
Figure 5:
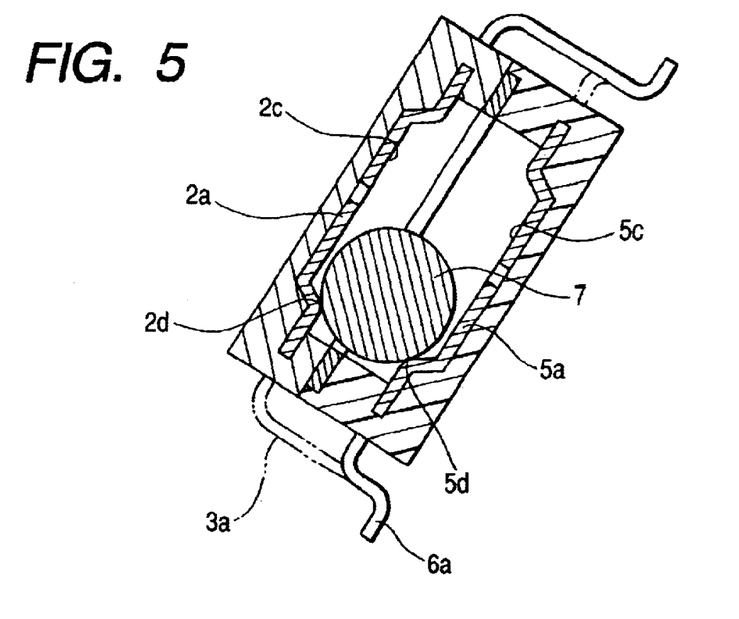
FIG. 5 illustrates how a movable contact operates when the tilt detector of FIG. 1 is inclined leftward.
Figure 6:
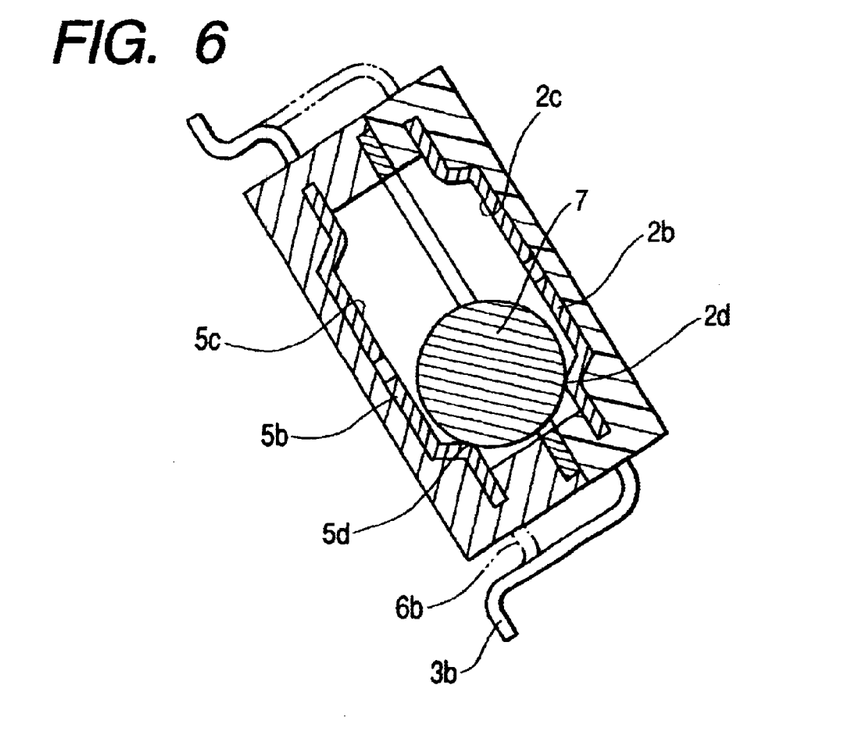
FIG. 6 illustrates how the movable contact operates when the tilt detector of FIG. 1 is inclined rightward.
Figure 7:
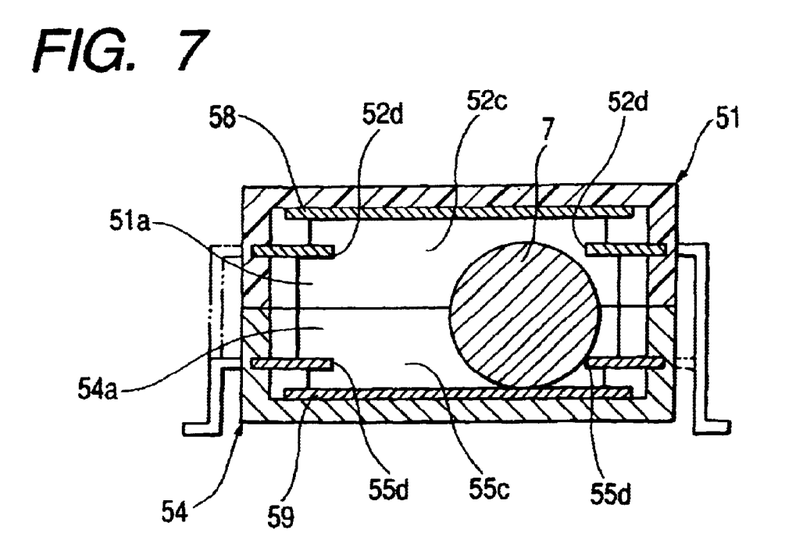
FIG. 7 is a vertical sectional view of a tilt detector according to another embodiment of the invention.

Embodiments of the present invention will be hereinafter described with reference to FIGS. 1–7. FIGS. 1 and 2 are an exploded perspective view and a vertical sectional view, respectively, of a tilt detector according to one embodiment of the invention. FIG. 3 is a bottom view of a first case. FIG. 4 is a plan view of a second case. FIG. 5 illustrates how a movable contact operates at the time of a leftward tilt. FIG. 6 illustrates how the movable contact operates at the time of a rightward tilt. FIG. 7 is a vertical sectional view of a tilt detector according to another embodiment of the invention.

As shown in FIGS. 1–6, the first case 1 is made of an insulative material such as a synthetic resin and assumes a box shape having a bottom opening. A circular first housing portion 1a having a bottom is formed inside the first case 1. A first fixed contact 2 that is a conductive metal plate is formed on almost the entire inside bottom surface (when the first case is viewed upside down) of the first housing portion 1a.

The first fixed contact 2 is divided at the center into two parts by an inclined line of approximately 45°; a pair of individual fixed contacts 2a and 2b are formed so as to be opposed to each other. A central portion of the first fixed contact 2 is a first recess 2c that projects toward the bottom surface (when the first case is viewed upside down) of the first housing portion 1a. Peripheral portions of the first recess 2c assume arc shapes and the arc-shaped peripheral portions are contact portions 2d that are to come into or go out of contact with a movable contact 7 (described later).

External terminals 3a and 3b lead from the respective individual fixed contacts 2a and 2b and project outward from the outer side faces of the first case 1. The external terminals 3a and 3b are bent so as to extend toward the bottom side (opening side) of the first case 1.

Like the first case 1, the second case 4 is made of an insulative material such as a synthetic resin and assumes a box shape having a top opening. A circular second housing portion 4a having a bottom is formed inside the opening of the second case 4. A second fixed contact 5 that is a conductive metal plate is formed on almost the entire inside bottom surface of the second housing portion 4a.

As in the case of the first case 1, the second fixed contact 5 is divided at the center into two parts by an inclined line of approximately 45°; a pair of individual fixed contacts 5a and 5b are formed so as to be opposed to each other. The first case 1 and the second case 4 are engaged with each other in such a manner that the first housing portion 1a and the second housing portion 4a are opposed to each other. The pair of individual fixed contacts 5a and 5b of the second fixed contact 5 and the pair of individual fixed contacts 2a and 2b of the first fixed contact 2 are formed at such positions that the former are deviated from the latter by 90° in the state that the first case 1 and the second case 4 are engaged with each other.

Since the pair of individual fixed contacts 5a and 5b of the second fixed contact 5 and the pair of individual fixed contacts 2a and 2b of the first fixed contact 2 are formed at such positions that the former are deviated from the latter by 90°, it is possible to detect a tilt in a larger number of (four or more) directions.

As in the case of the first case 1, a central portion of the second fixed contact 5 is a second recess 5c that projects toward the bottom surface of the second housing portion 4a. Peripheral portions of the second recess 5c assume arc shapes and the arc-shaped peripheral portions are contact portions 5d that are to come into or go out of contact with the movable contact 7 (described later).

As described above, the contact portions 2d and 5d where the movable contact 7 (described later) is to contact the first fixed contact 2 and the second fixed contact 5 are given arc shapes. Therefore, when the movable contact 7 contacts the first fixed contact 2 and/or the second fixed contact 5, the contact points always vary as the movable contact 7 rolls along the arc-shaped contact portions 2d and/or 5d. As a result, a contact failure as would otherwise be caused by variations in the contact intervals, sticking of foreign matter, or the like can be prevented.

Since the movable contact 7 can freely roll along the arc shaped contact portions 2d and 5d, even when external force is exerted on the tilt detector the impact can be absorbed without a bounce of the movable portion 7. Therefore, a short break (i.e., an instantaneous off state that would otherwise be caused by a bounce of the contact) can be prevented.

External terminals 6a and 6b lead from the respective individual fixed contacts 5a and 5b and project outward from the outer side faces of the second case 4. The external terminals 6a and 6b are bent so as to extend toward the bottom side of the second case 4.

The movable contact 7, which is made of a conductive metal material and assumes a spherical shape, is provided in a cavity that is formed by the first housing portion 1a of the first case 1 and the second housing portion 4a of the second case 4. As the movable contact 7 rolls by itself because of a tilt of the tilt detector, it comes into or goes out of contact with the contact portions 2d and 5d of the first fixed contact 2 and the second fixed contact 5. In doing so, the spherical movable contact 7 comes into or goes out of contact with the contact portions 2d and 5d while rolling on the flat surface of the first recess 2c of the first fixed contact 2 or the second recess 5c of the second fixed contact 5.

A conductor 8, which is an annular, conductive metal plate, is held between the two confronting surfaces of the first case 1 and the second case 4. The conductor 8 has a pair of projections 8a that project outward from the outer circumference of the annular potion. The pair of projections 8a project outward from side faces of the first case 1 and the second case 4 and serve as power receiving portions.

A current is caused to flow through the conductor 8 via its power receiving portions 8a, whereby the conductor 8 is heated and the confronting surfaces of first case 1 and the second case 4 that hold the conductor 8 in between are melted. The surfaces are thereafter cooled and hardened. In this manner, the first case 1 and the second case 4 can be fixed to each other.

Properly varying the cross-section of the annular portion of the conductor 8 between the projections (power receiving portions) 8a enables uniform transmission of heat to the annular portion. As a result, the first case 1 and the second case 2 can be heat-welded to each other reliably.

Next, the operation of the above-configured tilt detector will be described with reference to FIGS. 5 and 6.

When a device incorporating the tilt detector stands almost level with substantially no inclination toward any direction, as shown in FIG. 2 the movable contact 7 stands still at a certain position on one arc-shaped peripheral portion after rolling on the flat surface of the second recess 5c of the second fixed contact 5 of the second case 4. In this state, the movable contact 7 is in contact with one of the pair of individual fixed contacts 5a and 5b of the second recess 5c of the second fixed contact 5 but is out of contact with the first fixed contact 2.

If the device is inclined toward one direction (assumed here to be the leftward direction), as shown in FIG. 5 the movable contact 7 comes into contact with one arc-shaped peripheral portion (i.e., contact portion 5d) of the second recess 5c of the second fixed contact 5. Then, the movable contact 7 is rotated further with the contact portion 5d serving as a supporting point and comes into contact with one arc-shaped peripheral portion (i.e., contact portion 2d), opposed to the contact portion 5d, of the first recess 2c of the first fixed contact 2.

At this time, the movable contact 7 contacts the contact portion 2d while being accelerated by its own weight. Therefore, the movable contact 7 contacts the contact portion 2d with strong contacting force while breaking a thin insulative coating even if it existed. The resulting contact is therefore stable.

In this state, the individual fixed contacts 2a and 5a are connected to each other via the movable contact 7 in a state that the movable contact 7 bridges the first fixed contact 2 and the second fixed contact 5. A resulting on-signal is sent to a control circuit of the device via the external terminals 3a and 6a, whereby the leftward tilt of the device is detected.

If in this state the device is inclined toward another direction (assumed here to be the rightward direction), as shown in FIG. 6 the movable contact 7 goes off the first fixed contact 2, rolls on the flat surface of the second recess 5c of the second fixed contact 5, and then comes into contact with one arc-shaped peripheral portion (i.e., contact portion 5d) of the second recess 5c of the second fixed contact 5. Then, the movable contact 7 is rotated further with the contact portion 5d serving as a supporting point and comes into contact with one arc-shaped peripheral portion (i.e., contact portion 2d), opposed to the contact portion 5d, of the first recess 2c of the first fixed contact 2.

At this time, as in the case of the leftward tilt, the movable contact 7 contacts the contact portion 2d while being accelerated by its own weight. Therefore, the movable contact 7 contacts the contact portion 2d with strong contacting force while breaking a thin insulative coating even if it existed. The resulting contact is therefore stable.

In this state, the individual fixed contacts 2b and 5b are connected to each other via the movable contact 7 in a state that the movable contact 7 bridges the first fixed contact 2 and the second fixed contact 5. A resulting on-signal is sent to the control circuit of the device via the external terminals 3b and 6b, whereby the rightward tilt of the device is detected.

A similar operation is performed when the device is inclined in a direction (the top or bottom direction in FIG. 4) other than the rightward and leftward directions, and hence will not be described.

In the above embodiment, the first recess 2c and the second recess 5c that project toward the bottom surfaces of the housing portions 1a and 4a are formed at the centers of the first fixed contact 2 and the second fixed contact 5, respectively, and the movable contact 7 comes into or goes out of contact with the contact portions 2d and 5d as it rolls across the first recess 2c and the second recess 5c. Since all the surfaces of the recesses 2c and 5c across which the movable contact 7 rolls are metal surfaces and do not include resin surfaces of synthetic resin members or the like, there does not occur static electricity due to rolling friction or the like and hence sticking of foreign matter to the spherical movable contact 7 is suppressed. Stable contact can thus be attained.

FIG. 7 shows the structure of a tilt detector according to another embodiment of the invention.

The structures of the first and second contacts of this embodiment is partially different from those of the above embodiment.

Specifically, in this embodiment, arc shaped first openings 52c and arc-shaped second openings 55c are formed by punching at the centers of a first fixed contact 52 and a second fixed contact 55, respectively, instead of forming the recesses having the arc-shaped peripheral portions at the centers. The arc-shaped inner edges of the first fixed contact 52 and the second fixed contact 55 are contact portions 52d and 55d that a movable contact 7 is to contact as it rolls.

A first contact receiving member 58 and a second contact receiving member 59 that are flat metal plates are formed at the bottoms of a first housing portion 51a of a first case 51 and a second housing portion 54a of a second case 54, respectively, that are opposed to each other. The first contact receiving member 58 and the second contact receiving member 59 are opposed to each other with the first openings 52c and the second openings 55c interposed in between. The movable contact 7 rolls on the flat surface of the first contact receiving member 58 or the second contact receiving member 59 as it moves in the first openings 52c and the second openings 55c that are opposed to each other.

An operation that is similar to the operation of the above embodiment is performed when the tilt detector is inclined, and hence will not be described.

In this embodiment, the contact portions 52d and 55d that the movable contact 7 is to contact as it rolls can be formed at the centers of the first fixed contact 52 and the second fixed contact 55 by merely pinching (e.g., pressing) a flat metal plate; it is not necessary to form recesses by drawing or the like. Therefore, the tilt detector is simple in structure and can be reduced in cost.

Further, the first contact receiving member 58 and the second contact receiving member 59 having metal surfaces (including no resin surfaces) are formed in the first openings 52c and the second openings 55c across which the movable contact 7 rolls. Therefore, there does not occur static electricity due to rolling friction or the like and hence sticking of foreign matter to the spherical movable contact 7 is suppressed. Stable contact can thus be attained.

What is claimed is:

1. A tilt detector comprising:

a first case that has a housing portion and in which a first fixed contact is provided on a bottom surface of the housing portion;

a second case that has a housing portion and in which a second fixed contact is provided on a bottom surface of the housing portion; and a spherical movable contact that is housed in the housing portions of the first case and the second case so as to be able to roll and that is to come into or go out of contact with the first fixed contact and the second fixed contact, wherein:

the first case and the second case are fixed to each other so as to form an integral body in such a manner that the first fixed contact and the second fixed contact are opposed to each other;

at least one of the first fixed contact and the second fixed contact is divided;

the movable contact is disposed so as to roll while bridging the first fixed contact and the second fixed contact; and contact portions where the movable contact is to contact the first fixed contact and the second fixed contact assume arc shapes, respectively.

2. The tilt detector according to claim 1, wherein both of the first fixed contact and the second fixed contact are divided into at least two parts, and at least two divisional parts of the first fixed contact and at least two divisional parts of the second fixed contact are opposed to each other in such a manner as to be deviated from each other by 90°.

3. The tilt detector according to claim 1, further comprising a first recess and a second recess that are formed at centers of the first fixed contact and the second fixed contact so as to project toward the bottom surfaces of the housing portions, respectively, wherein the movable contact comes into or goes out of contact with the contact portions as it rolls across the first recess and the second recess that are opposed to each other.

4. The tilt detector according to claim 1, further comprising arc-shaped first openings and arc-shaped second openings that are formed by punching at centers of the first fixed contact and the second fixed contact, respectively, and contact receiving members that are metal plates and are formed on the bottom surfaces of the housing portions, respectively, so as to be opposed to each other with the first openings and the second openings interposed in between, wherein the movable contact comes into or goes out of contact with the contact portions as it rolls in the first openings and the second openings that are opposed to each other.

* * * * *